United States Patent
Peng et al.

(10) Patent No.: US 11,145,314 B2
(45) Date of Patent: Oct. 12, 2021

(54) METHOD AND APPARATUS FOR VOICE IDENTIFICATION, DEVICE AND COMPUTER READABLE STORAGE MEDIUM

(71) Applicant: Baidu Online Network Technology (Beijing) Co., Ltd., Beijing (CN)

(72) Inventors: Xingyuan Peng, Beijing (CN); Junyao Shao, Beijing (CN); Lei Jia, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 28 days.

(21) Appl. No.: 16/811,801

(22) Filed: Mar. 6, 2020

(65) Prior Publication Data
US 2021/0056975 A1    Feb. 25, 2021

(30) Foreign Application Priority Data

Aug. 22, 2019  (CN) .......................... 201910779740.2

(51) Int. Cl.
*G10L 17/10*  (2013.01)
*G10L 17/04*  (2013.01)
(Continued)

(52) U.S. Cl.
CPC .............. *G10L 17/10* (2013.01); *G10L 15/02* (2013.01); *G10L 15/06* (2013.01); *G10L 17/02* (2013.01);
(Continued)

(58) Field of Classification Search
CPC ......... G10L 17/10; G10L 17/04; G10L 15/02; G10L 15/06; G10L 17/18; G10L 17/02; G10L 17/14
(Continued)

(56) References Cited

U.S. PATENT DOCUMENTS 8,805,684 B1 * 8/2014 Aleksic .................. G10L 15/07
                                                   704/244
9,123,333 B2 * 9/2015 Amarilli ................. G10L 15/08
(Continued)

FOREIGN PATENT DOCUMENTS

CN       105869624 A       8/2016
CN       108417202    *    8/2018
(Continued)

OTHER PUBLICATIONS

Battenberg, Eric, et al. "Exploring neural transducers for end-to-end speech recognition." 2017 IEEE Automatic Speech Recognition and Understanding Workshop (ASRU). IEEE, 2017.*

(Continued)

*Primary Examiner* — Edwin S Leland, III
(74) *Attorney, Agent, or Firm* — Nixon Peabody LLP

(57) ABSTRACT

Embodiments of the present disclosure provide a method and apparatus for voice identification, a device and a computer readable storage medium. The method may include: for an inputted voice signal, obtaining a first piece of decoded acoustic information by a first acoustic model and obtaining a second piece of decoded acoustic information by a second acoustic model, where the second acoustic model being generated by joint modeling of acoustic model and language model. The method may further include determining a first group of candidate identification results based on the first piece of decoded acoustic information, determining a second group of candidate identification results based on the second piece of decoded acoustic information, and then determining a final identification result for the voice signal based on the first group of candidate identification results and the second group of candidate identification results.

17 Claims, 5 Drawing Sheets

(51) Int. Cl.
*G10L 15/02* (2006.01)
*G10L 15/06* (2013.01)
*G10L 17/18* (2013.01)
*G10L 17/02* (2013.01)
*G10L 17/14* (2013.01)

(52) U.S. Cl.
CPC .............. *G10L 17/04* (2013.01); *G10L 17/14* (2013.01); *G10L 17/18* (2013.01)

(58) Field of Classification Search
USPC ........................................................ 704/246
See application file for complete search history.

(56) References Cited

U.S. PATENT DOCUMENTS

| | | | |
|---|---|---|---|
| 9,263,036 B1* | 2/2016 | Graves | G10L 15/16 |
| 9,799,327 B1* | 10/2017 | Chan | G06F 40/12 |
| 9,881,615 B2* | 1/2018 | Choi | G10L 15/16 |
| 2006/0074655 A1* | 4/2006 | Bejar | G10L 15/063 704/243 |
| 2017/0053652 A1 | 2/2017 | Choi et al. | |
| 2018/0277103 A1* | 9/2018 | Wu | G10L 25/24 |
| 2020/0027444 A1* | 1/2020 | Prabhavalkar | G10L 15/16 |
| 2020/0066271 A1* | 2/2020 | Li | G10L 15/22 |
| 2020/0219486 A1* | 7/2020 | Fu | G10L 15/10 |
| 2021/0020175 A1* | 1/2021 | Shao | G10L 15/197 |
| 2021/0056975 A1* | 2/2021 | Peng | G10L 17/04 |
| 2021/0158799 A1* | 5/2021 | Zhang | G10L 15/02 |

FOREIGN PATENT DOCUMENTS

| | | | |
|---|---|---|---|
| CN | 108417202 | A | 8/2018 |
| CN | 109215662 | * | 1/2019 |
| CN | 109215662 | A | 1/2019 |
| CN | 110111775 | * | 8/2019 |
| CN | 110111775 | A | 8/2019 |
| CN | 110189748 | * | 8/2019 |
| JP | 2010055020 | A | 3/2010 |
| JP | 2017040919 | A | 2/2017 |

OTHER PUBLICATIONS

Xiong, Hao, et al. "Dutongchuan: Context-aware translation model for simultaneous interpreting." arXiv preprint arXiv: 1907.12984 (2019).*

Wrede, Sebastian Benjamin, and Sebastian Baunsgaard. "Scalable Speech Recognition." (2019).*

* cited by examiner

METHOD AND APPARATUS FOR VOICE IDENTIFICATION, DEVICE AND COMPUTER READABLE STORAGE MEDIUM

CROSS-REFERENCE TO RELATED APPLICATIONS

This application claims priority to Chinese Patent Application No. 201910779740.2, filed on Aug. 22, 2019, titled "Method and apparatus for voice identification, device, and computer readable storage medium," which is hereby incorporated by reference in its entirety.

TECHNICAL FIELD

Embodiments of the present disclosure generally relate to the field of voice identification technology, and more specifically to a method and apparatus for voice identification based on double decoding, a device, and a computer readable storage medium.

BACKGROUND

Voice identification refers to a process of converting a voice signal into a corresponding text by a computer, converts vocabulary content in a human voice into an actual text output, and is one of the main approaches for achieving man-machine interaction. In recent years, with the widespread use of deep learning technology in the field of voice identification, the accuracy rate of voice identification has been greatly improved. In addition, due to the increasing popularity of smart devices, scenarios where voice is used for identification have become very abundant. For example, the voice identification technology has been widely used in various scenarios, such as voice input method, voice dialing, and vehicle navigation. The voice identification technology, when combined with technologies, such as natural language processing and voice synthesis, may produce more complex applications, such as smart speaker, simultaneous conference interpretation, and smart customer service assistant. The accuracy rate of voice identification determines the user experience of voice-related product users, and directly affects modules, such as subsequent semantic understanding and dialogue generation, in an interaction process. Therefore, as the use scenarios of voice identification are increasingly abundant, higher requirements for the accuracy rate of voice identification are presented.

With the continuous development of artificial intelligence, various new voice identification technologies are also being introduced to improve the accuracy rate of voice identification. The era of deep learning of voice identification has been started from an early acoustic modeling method of Gaussian Hybrid Model-Hidden Markov Model (GMM-HMM) to replacing GMM modeling with a deep neural network (DNN) structure. Then, replacing a DNN model with a network structure, such as a convolutional neural network (CNN), a gated recurrent neural network (GRU), and a long short-term memory network (LSTM), has significantly improved the modeling accuracy of a neural network model. Then, an end-to-end connectionist temporal classification (CTC) model is used for voice identification, and the acoustic model structure is completely replaced by a unified neural network structure, thereby greatly simplifying the acoustic model structure and the training difficulty, and further improving the identification rate. In recent years, an end-to-end LAS (Listen, Attend and Spell) structure established based on an attention mechanism further improves the accuracy rate of voice identification by joint modeling of acoustic and language models.

SUMMARY

Embodiments of the present disclosure provide a method and apparatus for voice identification based on double decoding, a device, and a computer readable storage medium.

In a first aspect, an embodiment of the present disclosure provides a method for voice identification, including: obtaining, for an inputted voice signal, a first piece of decoded acoustic information and a second piece of decoded acoustic information respectively by a first acoustic model and a second acoustic model, the first acoustic model being generated by acoustic modeling and the second acoustic model being generated by joint modeling of acoustic model and language model; determining a first group of candidate identification results and a second group of candidate identification results respectively based on the first piece of decoded acoustic information and the second piece of decoded acoustic information; and determining an identification result for the voice signal based on the first group of candidate identification results and the second group of candidate identification results.

In a second aspect, an embodiment of the present disclosure provides an apparatus for voice identification, including: an acoustic information obtaining module configured to obtain, for an inputted voice signal, a first piece of decoded acoustic information and a second piece of decoded acoustic information respectively by a first acoustic model and a second acoustic model, the first acoustic model being generated by acoustic modeling and the second acoustic model being generated by joint modeling of acoustic model and language model; a candidate result determining module configured to determine a first group of candidate identification results and a second group of candidate identification results respectively based on the first piece of decoded acoustic information and the second piece of decoded acoustic information; and an identification result determining module configured to determine an identification result for the voice signal based on the first group of candidate identification results and the second group of candidate identification results.

In a third aspect, an embodiment of the present disclosure provides an electronic device, including: one or more processors; and a storing apparatus configured to store one or more programs, wherein the one or more programs, when executed by the one or more processors, cause the electronic device to implement the method or process according to any embodiment of the present disclosure.

In a fourth aspect, an embodiment of the present disclosure provides a computer readable storage medium, storing a computer program thereon, wherein the program, when executed by a processor, implements the method or process according to any embodiment of the present disclosure.

It should be understood that contents described in the "SUMMARY" part is neither intended to limit key features or important features of embodiments of the present disclosure, nor intended to limit the scope of the present disclosure. Other features of the present disclosure will become readily understood in conjunction with the following description.

BRIEF DESCRIPTION OF THE DRAWINGS

In conjunction with the accompanying drawings and with reference to detailed descriptions below, the above and other features, advantages, and aspects of various embodiments of the present disclosure will become more apparent. Identical or similar reference numerals in the accompanying drawings represent identical or similar elements.

DETAILED DESCRIPTION OF EMBODIMENTS

Figure 1:
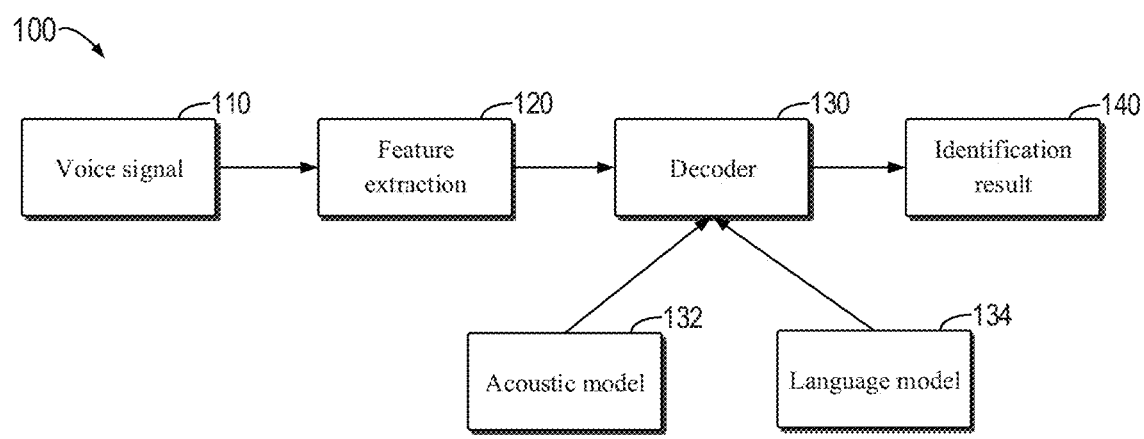
FIG. 1 shows a schematic diagram of a process of voice identification according to an embodiment of the present disclosure.

Embodiments of the present disclosure will be described below in more detail with reference to the accompanying drawings. Some embodiments of the present disclosure are shown in the accompanying drawings. However, it should be understood that the present disclosure may be implemented by various approaches, and should not be construed as being limited to the embodiments set forth herein. On the contrary, these embodiments are provided to more thoroughly and completely understand the present disclosure. It should be understood that the accompanying drawings and embodiments of the present disclosure are not intended to limit the scope of protection of the present disclosure.

In the description of the embodiments of the present disclosure, the term "including" and similar wordings thereof should be construed as open-ended inclusions, i.e., "including but not limited to." The term "based on" should be construed as "at least partially based on." The term "an embodiment" or "the embodiment" should be construed as "at least one embodiment." The term "some embodiments" should be construed as "at least some embodiments." Other explicit and implicit definitions may be further included below.

The connectionist temporal classification (CTC) model is an end-to-end model that is used for voice identification of a large number of words, such that a hybrid DNN+HMM acoustic model structure is completely replaced by a unified neural network structure, thereby greatly simplifying the structure and training difficulty of the acoustic model, and further improving the accuracy rate of a voice identification system. In addition, an output result of the CTC model may include peak information of a voice signal.

An attention model is extension of an encoder-decoder model, which can improve the prediction effect on a long sequence. First, inputted audio features are coded using a GRU or LSTM model to obtain hidden features, then corresponding weights are assigned to different parts of these hidden features by the attention model, and finally, a decoder outputs corresponding results based on different modeling granularities. This joint modeling of acoustic and language models can further simplify the complexity of the voice identification system.

A streaming multi-layer truncated attention (SMLTA for short) model is a streaming voice identification model based on CTC and attention, where the "streaming" means that small fragments of a voice (instead of requiring a whole sentence) can be directly decoded incrementally one by one, the "multi-layer" means to stack multi-layer attention models, while the "truncated" means to segment the voice into small fragments one by one using the peak information of the CTC model. Modeling and decoding of the attention model can be expanded on these small fragments. SMLTA converts traditional global attention modeling into local attention modeling. Thus, this process is also a process that can be implemented in streaming. No matter how long a sentence is, streaming decoding and accurate local attention modeling can be implemented by truncation, thus achieving streaming decoding.

The inventors of the present disclosure find that in the process of decoding the acoustic model (e.g., an attention model or an SMLTA model based on an attention mechanism) generated by joint modeling of acoustic and language models, a search path can be constrained to a more accurate space based on language information and then decoded, thereby significantly improving the voice identification rate. However, this joint modeling approach may introduce prior constraint information of a language into the voice identification system, resulting in less acoustic diversity among N best candidates. In the case of insufficient regular training, identification for wider domains can lead to compromised accuracy rates. If the language constraint information training is not enough, then it may be very easy to pre-clip a correct search path, such that finally, it may be impossible to obtain a correct identification result.

Thus, it can be seen that this acoustic model generated by joint modeling of acoustic and language models improves an identification rate of 1 best candidate result, but reduces the acoustic diversity of an identification rate of N best candidate results, compared with that of a conventional non-joint modeling approach (e.g., the CTC model). In addition, some double decoding methods that rely on the N best candidate results will be seriously limited. Therefore, the joint modeling approach introduces language information in a modeling process of the acoustic model, which improves the identification accuracy rate to a certain extent, but in some cases, unreasonable language constraints will also limit the diversity of an acoustic decoding path, and affect the identification accuracy rate in some scenarios.

In addition, the inventors of the present disclosure further find that joint modeling of acoustic and language models may better learn a domain feature existing in training data, but may affect the identification performance in other general domains. This waxing and waning restrictive relationship also has limited the further improvement of the voice identification rate by joint modeling of acoustic and language models.

Thus, some embodiments of the present disclosure present a solution of voice identification based on double decoding, which may further improve the accuracy rate of voice identification. In the solution of voice identification based on double decoding presented by some embodiments of the present disclosure, the acoustic diversity of one acoustic model is used to make up for the defects of a few acoustic paths of another acoustic model (i.e., the acoustic model obtained by joint modeling of acoustic and language models), where two decoding paths are independent of each other to expand the decoding space, thereby improving the accuracy rate of voice identification. In some embodiments, for the SMLTA model based on the attention mechanism, the decoding result of the CTC model may be used to improve the acoustic diversity of the decoding result of the SMLTA model, thereby further improving the identification performance of the SMLTA model. In addition, some embodiments of the present disclosure may further comprehensively sort all candidate results of double decoding by multi-feature fusion, to further improve the accuracy rate of voice identification. Some example implementations of some embodiments of the present disclosure will be described in detail below with reference to FIGS. 1-8.

FIG. 1 shows a schematic diagram of a process 100 of voice identification according to an embodiment of the present disclosure. Generally, a voice identification system may include components, such as an acoustic model, a language model, and a decoder. As shown in FIG. 1, after obtaining a collected voice signal 110, signal processing and feature extraction on the voice signal 110 are first performed at block 120, including extracting a feature from the inputted voice signal 110, for subsequent processing by, e.g., the acoustic model. Alternatively, the feature extraction process further includes some other signal processing technologies, to reduce the impact of environmental noise or other factors on features.

Referring to FIG. 1, after feature extraction 120 is completed, the extracted features are inputted into a decoder 130, and the decoder 130 outputs a text identification result 140 after processing. Specifically, the decoder 130 finds a text sequence of a voice signal outputted with a maximum probability based on an acoustic model 132 and a language model 134, where the acoustic model 132 can realize conversion from a voice to pronunciation fragments, and the language model 134 can realize conversion from the pronunciation fragments to a text.

The acoustic model 132 is used for joint modeling of acoustic model and language model on the pronunciation fragments, and a modeling unit thereof may be, for example, a syllable. In some embodiments of the present disclosure, the acoustic model 132 may be a streaming multi-layer truncated attention (SMLTA) model, in which the SMLTA model can segment the voice into a plurality of small fragments using peak information of a CTC model, such that modeling and decoding of an attention model can be performed on each small fragment. Such a SMLTA model can support real-time streaming voice identification, and achieve a high identification accuracy rate.

The language model 134 is used for modeling a language. Generally, a statistical N-Gram may be used, i.e., statisticizing probabilities of occurrence of N front words and N back words. It should be understood that any language model that is known or will be developed in the future may be used in combination with some embodiments of the present disclosure. In some embodiments, the acoustic model 132 may be trained and/or may work based on a voice database, while the language model 134 may be trained and/or may work based on a text database.

The decoder 130 may implement dynamic decoding based on identification results outputted by the acoustic model 132 and the language model 134. According to some embodiments of the present disclosure, the decoder 130 can start two independent decoding threads simultaneously, to implement double decoding of the voice signal, and uses the acoustic diversity of one acoustic model to make up for the defects of a few acoustic paths of another acoustic model, where two decoding paths are independent of each other to expand the decoding space, thereby improving the accuracy rate of voice identification. Some example implementations of the method for voice identification based on double decoding are further described below.

In a scenario of voice identification, a user is talking to his user device, and a user-generated voice (i.e., sound) is collected by the user device. For example, the voice may be collected by a sound collecting device (e.g., a microphone) of the user device. The user device may be any electronic device capable of collecting voice signals, including but not limited to a smartphone, a tablet computer, a desktop computer, a notebook computer, a smart wearable device (e.g., a smart watch, and smart glasses), a navigation device, a multimedia player device, an education device, a gaming device, a smart speaker, and the like. In the collection process, the user device can send the voice to a server in fragments via a network. The server includes a voice identification model that can realize real-time and accurate voice identification. After completing the identification, an identification result can be sent to the user device via the network. It should be understood that the method for voice identification according to some embodiments of the present disclosure may be executed at the user device, or may be executed at the server, or a part of the method is executed at the user device, while another part is executed at the server.

Figure 2:
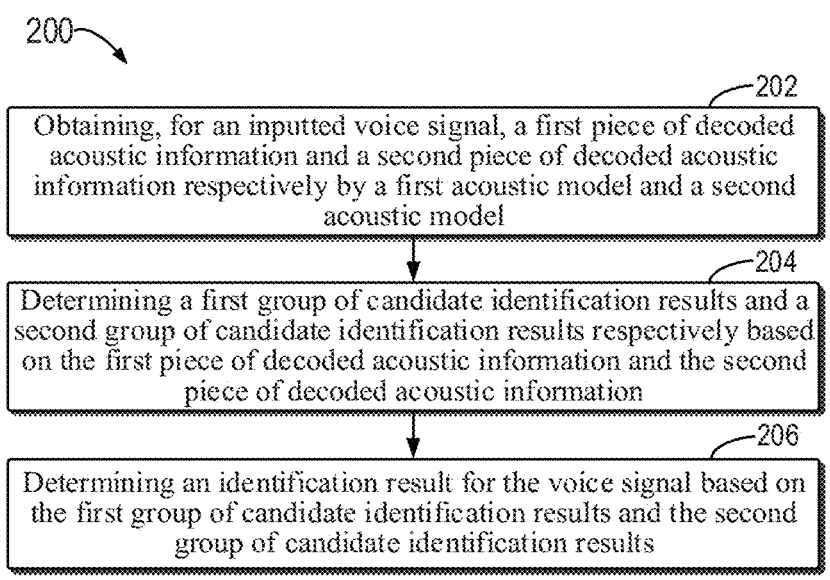
FIG. 2 shows a flowchart of a method for voice identification according to an embodiment of the present disclosure.

FIG. 2 shows a flowchart of a method 200 for voice identification according to an embodiment of the present disclosure. It should be understood that the method 200 may be executed by a user device, or a server, or a combination thereof. In order to facilitate clear description of the method 200, the method 200 is described herein together with, and with reference to, a process 300 of voice identification based on double decoding in FIG. 3.

At block 202, obtaining, for an inputted voice signal, a first piece of decoded acoustic information and a second piece of decoded acoustic information respectively by a first acoustic model and a second acoustic model, the first acoustic model being generated by acoustic modeling and the second acoustic model being generated by joint modeling of acoustic model and language model. For example, referring to FIG. 3, for an inputted voice signal 310, acoustic decoding is performed respectively at blocks 311 and 312 based on different acoustic models. Specifically, at block 311, an acoustic model 313 processes features of a voice signal 310 to generate decoded acoustic information 321; and at block 312, an acoustic model 314 processes the features of the voice signal 310 to generate decoded acoustic information 322, where the acoustic model 313 is a model generated only by acoustic modeling, and the acoustic model 314 is an acoustic model (e.g., an attention-based acoustic model) generated by joint modeling of acoustic model and language model. Due to language constraints of the acoustic model 314 generated by joint modeling, the acoustic model may pre-clip a correct decoding path, which may result in failure to obtain a correct identification result. Therefore, introducing a decoding result of the acoustic model 313 without language constraints can make up for the defects of lack of the correct decoding path caused by the acoustic model 314.

At block 204, determining a first group of candidate identification results and a second group of candidate identification results respectively based on the first piece of decoded acoustic information and the second piece of decoded acoustic information. For example, referring to FIG. 3, at block 331, executing language decoding, and determining one group of candidate identification results 341 based on the decoded acoustic information 321 and a language model 333; and at block 332, executing different language decoding, and determining other group of candidate identification results 342 based on the decoded acoustic information 322 and a language model 334. Therefore, according to some embodiments of the present disclosure, two groups of candidate identification results can be generated simultaneously, thereby expanding the scope of candidate identification results.

At block 206: determining an identification result for the voice signal based on the first group of candidate identification results and the second group of candidate identification results. For example, further referring to FIG. 3, a final identification result 350 of the voice signal 310 is determined based on the one group of candidate identification results 341 and the other group of candidate identification results 342. In some embodiments, the final identification result may be selected or generated from all candidate identification results by multi-feature fusion. Alternatively, a best candidate identification result may be selected directly from the two groups of candidate identification results, for use as a final voice identification result. Alternatively, each candidate identification result in the two groups of candidate identification results may be combined in fragments, or a new identification result may be regenerated based on the two groups of candidate identification results.

Therefore, the method 200 according to some embodiments of the present disclosure uses the acoustic diversity of one acoustic model (i.e., the acoustic model 313 obtained only by acoustic modeling) to make up for the defects of a few acoustic paths of another acoustic model (i.e., the acoustic model 314 generated by joint modeling of acoustic model and language model), where two decoding paths are independent of each other to expand the decoding space, thereby improving the accuracy rate of voice identification.

Figure 3:
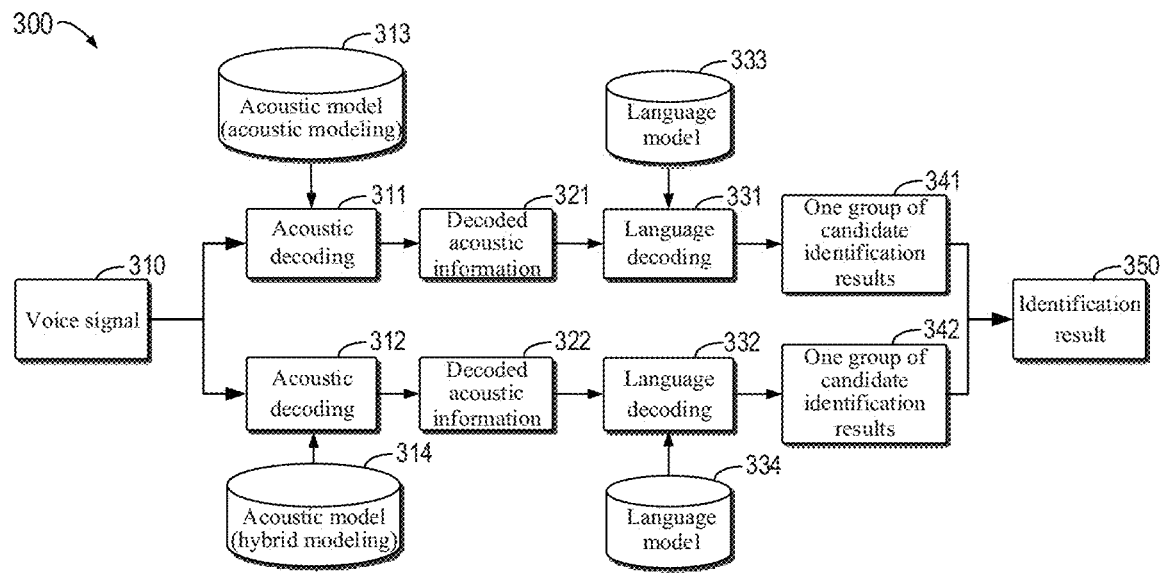
FIG. 3 shows a schematic diagram of a process of voice identification based on double decoding according to an embodiment of the present disclosure.

Referring to FIG. 3, in some scenarios, both the one group of candidate identification results 341 and the other group of candidate identification results 342 may include the final identification result 350. However, in some scenarios, the one group of candidate identification results 341 may include the final identification result 350, while the other group of candidate identification results 342 does not include the final identification result 350. Therefore, based on decoding of the acoustic model 314 of hybrid modeling, decoding of the acoustic model 313 is additionally provided to use the diversity of the decoding result of the acoustic model 313 to make up for the lack of decoding result of the acoustic model 314, thereby improving the accuracy rate of voice identification.

Alternatively, the language model 333 and the language model 334 may be the same language model. Alternatively, the language model 333 and the language model 334 may also be different language models, and each has its own tendency and division of work. For example, the language model 334 may include some texts in a specific field and/or scenario, and the language model 333 may include some texts in a general field. In this way, the decoding result based on the language model 334 is more professional, and the decoding result based on the language model 333 is more universal. The two models complement each other, thereby further improving the accuracy rate of voice identification.

It should be understood that the acoustic models 313 and 314 are shown as separated models in FIG. 3, but there may further be an association relationship and an inclusion relationship between the acoustic model 313 and the acoustic model 314. In some embodiments of the present disclosure, the acoustic model 314 may be a SMLTA model, and the acoustic model 313 may be a CTC model inside the SMLTA model. An example architecture of the SMLTA model is further described below with reference to FIG. 5.

Figure 4:
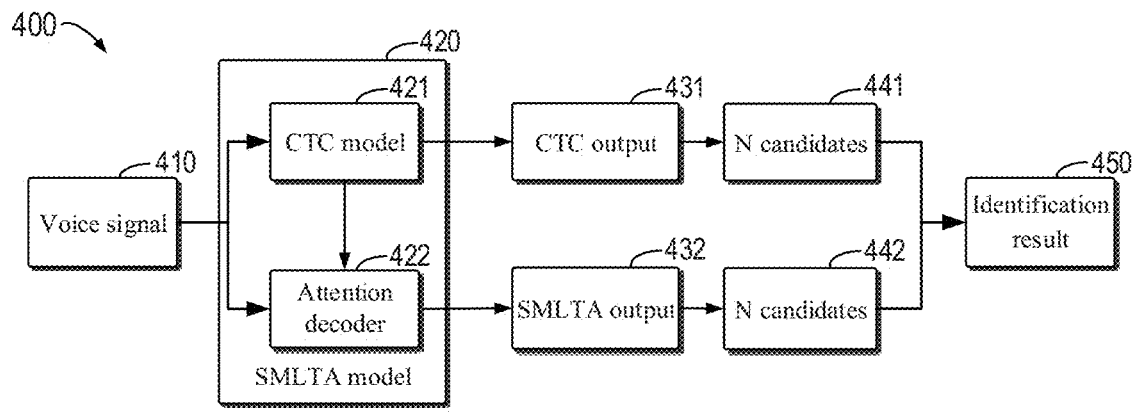
FIG. 4 shows a schematic diagram of a process of voice identification based on double decoding of streaming multi-layer truncated attention (SMLTA) and connectionist temporal classification (CTC) according to an embodiment of the present disclosure.

FIG. 4 shows a schematic diagram of a process 400 of voice identification based on double decoding of SMLTA and CTC according to an embodiment of the present disclosure. In the example of FIG. 4, the first acoustic model described in FIG. 2 is a CTC model 421 and the second acoustic model described in FIG. 2 is a SMLTA model 420. As shown in FIG. 4, for a received voice signal 410, the SMLTA model 420 can generate a SMLTA output 432, and then a SMLTA decoder generates N candidate identification results 442 based on the SMLTA output 432. For example, the CTC model 421 in the SMLTA model 420 can generate peak information of the voice signal 410, and an attention decoder 422 in the SMLTA model 420 can accurately truncate the voice signal 410 based on the voice signal 410 and the peak information provided by the CTC model 421, thereby improving the streaming online voice identification capability of the attention decoder 422.

According to some embodiments of the present disclosure, CTC decoding is additionally provided on the basis of SMLTA decoding. As shown in FIG. 4, when the SMLTA model 420 is generating the SMLTA output 432, the CTC model 421 in the SMLTA model 420 generates a CTC output 431 simultaneously, and then a CTC decoder also generates N candidate identification results 441 based on the CTC output 431. Compared with the SMLTA output 432 generated by SMLTA decoding, the CTC output 431 generated by CTC decoding has more acoustic diversity due to no language constraints. Therefore, the accuracy rate of an identification result 450 can be further improved by additionally providing CTC decoding on the basis of SMLTA decoding.

Therefore, the process 400 of FIG. 4 according to some embodiments of the present disclosure introduces a candidate identification result of CTC decoding, thereby expanding irreparable misidentification caused by insufficient training data in SMLTA modeling, and improving the identification performance of the SMLTA model. In addition, the two decoding paths do not affect each other, which is essentially equivalent to expanding the decoding space, and can alleviate the problem that a single decoder pre-clips a correct identification result due to the sound signal attenuation and the background environmental noise during identification, thereby improving the accuracy rate of voice identification.

Figure 5:
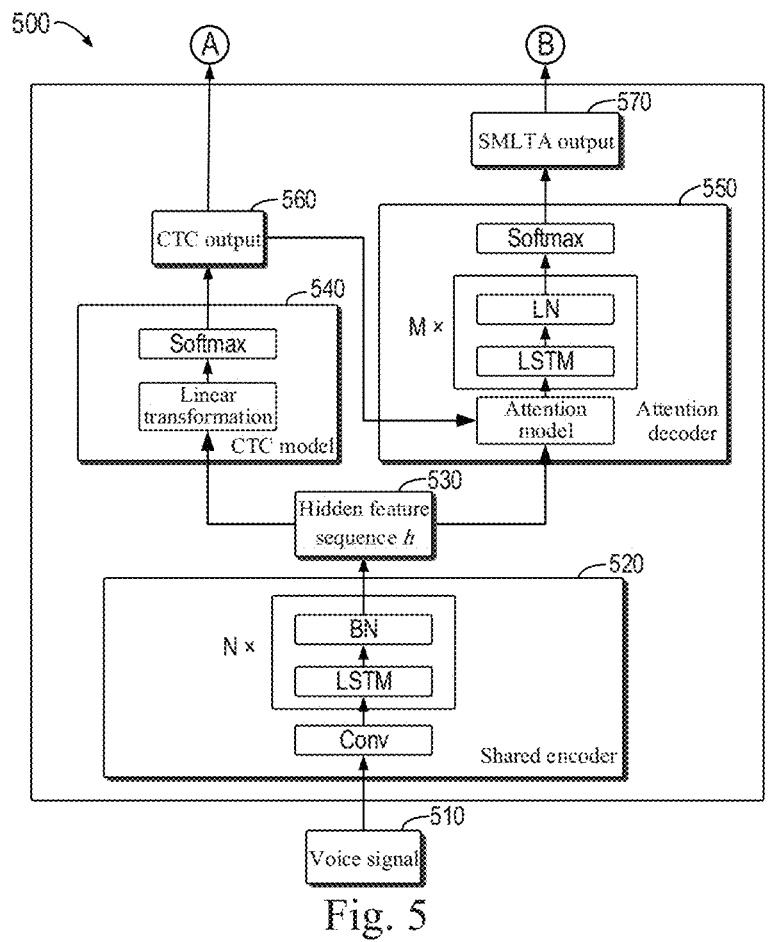
FIG. 5 shows a schematic diagram of an example architecture of a SMLTA model based on CTC peak information according to an embodiment of the present disclosure.

FIG. 5 shows a schematic diagram of an example architecture of a SMLTA model 500 based on CTC peak information according to an embodiment of the present disclosure. As shown in FIG. 5, the SMLTA model 500 mainly includes three parts: a shared decoder 520 configured to code a feature of an inputted voice signal 510 into a hidden feature sequence 530 (i.e., a hidden feature sequence h); a CTC model 540 configured to generate a CTC output 560 including peak information based on the hidden feature sequence 530; and an attention decoder 550 configured to obtain a real-time SMLTA decoded output 570 based on the hidden feature sequence 530 and the peak information, where peaks may be separated by blanks, and a peak may represent a syllable or a group of phonemes, e.g., a combination of high-frequency phonemes.

As shown in FIG. 5, in the SMLTA model 500, the shared encoder 520 is shared by the CTC model 540 and the attention decoder 550, forming a "double-headed structure"

of the CTC model 540 and the attention decoder 550. The main computing workload in the SMLTA model 550 is concentrated on the shared encoder 520 and the attention decoder 550. Therefore, compared with the conventional attention model, the SMLTA model 550 according to some embodiments of the present disclosure hardly increases the computing workload of the whole model architecture (i.e., the computing workload is increased, but the increased computing workload accounts for a very low proportion, and almost can be neglected), but can provide both the CTC output 560 (i.e., the peak information) and the attention output 570 (i.e., decoded acoustic information), and can solve the problem of large-scale industrial deployment of the SMLTA model 500 of some embodiments of the present disclosure very well. On the contrary, if the conventional approach would like to use the two models in combination in products, double online computing workload may be caused, thereby resulting in very high costs, and failure in large-scale industrial use.

Figure 6:
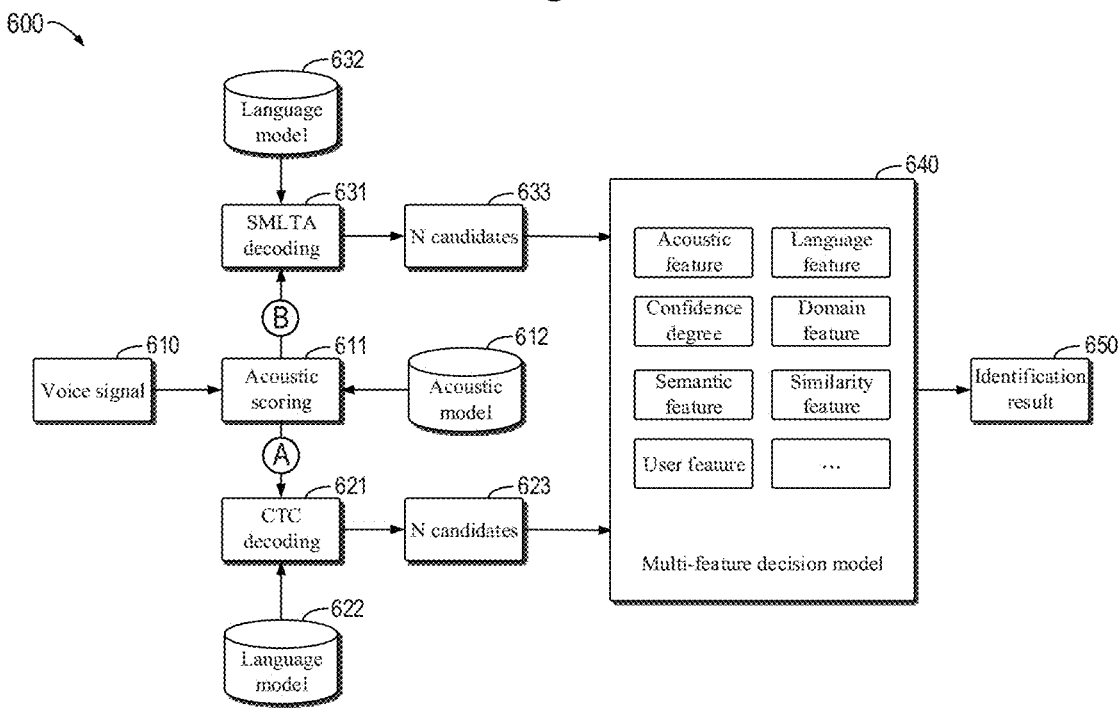
FIG. 6 shows a schematic diagram of a process of adjustment and optimization by double decoding of SMLTA and CTC fusing multiple features according to an embodiment of the present disclosure.

Further referring to FIG. 5, in the executing process of the SMLTA model, the CTC model generates the CTC output 560 (which can be further used at a location(A) in FIG. 6), provides its peak information to the attention decoder 550 for truncation, and then obtains the SMLTA output 570 (which can be further used at a location(B) in FIG. 6). In this process, the CTC output 560 has been generated without the need for further computing. Therefore, according to some embodiments of the present disclosure, the CTC output 560 and the SMLTA output 570 are generated simultaneously without increasing an additional computing workload. On the contrary, a compact CTC and attention double-headed structure in the SMLTA model structure is fully used. In the process of implementing double decoding, it is necessary to perform acoustic computing only once, thereby greatly saving the computing resources and the processing time. Therefore, the CTC output 560 and the SMLTA output 570 can be outputted simultaneously from the SMLTA model 500 for subsequent further decoding.

Further referring to FIG. 5, the shared encoder 520 includes 1 convolutional layer (Cony), N LSTMs, and a batch normalization (BN) layer, where N may be a positive integer (e.g., 5), and the LSTM may be a unidirectional LSTM. For a given inputted voice signal, the shared encoder 520 first codes the voice signal to obtain a corresponding hidden feature sequence 530. In some embodiments, the voice signal 510 may have been subjected to feature extraction for use as a model input x before being inputted into the shared encoder 520. It should be understood that while an internal hierarchical structure of the shared encoder 520 is shown in FIG. 5, shared encoders of other structures may also be used in combination with some embodiments of the present disclosure.

The CTC model 540 contains 1 linear layer and 1 SoftMax layer, uses the CTC training criterion to obtain description information of the peak of an inputted hidden feature sequence 530, thereby generating the CTC output 560 including the peak information, and then transfers the peak information to the attention decoder 550, for truncating the hidden feature sequence 530 into a plurality of subsequences using the peak information.

The attention encoder 550 includes 1 attention model layer, M LSTM layers, a layer normalization (LN) layer, and 1 SoftMax layer, where M may be a positive integer (e.g., 2), and the LSTM may be a unidirectional LSTM. The attention decoder 550 can truncate the hidden feature sequence 530 into consecutive subsequences one by one based on the received hidden feature sequence 530 and peak information. The attention decoder 550 filters the truncated subsequences through the attention mechanism, and finally obtains corresponding output probability distribution. The shared encoder 520 and the decoder 550 use the unidirectional LSTM as a basic network structure, and truncates the hidden feature sequence into subsequences only depending on historical information of the hidden feature, such that the voice identification system can perform decoding in real time whilst inputting an audio signal, without having to wait for inputting the entire audio signal before starting decoding, thereby realizing real-time voice identification. It should be understood that while an internal hierarchical structure of the attention encoder 550 is shown in FIG. 5, attention encoders of other structures may also be used in combination with some embodiments of the present disclosure.

A compact CTC and attention integrated STMLA model shown in FIG. 5 has both a head of the CTC model 540 and a head of the attention decoder 550, and may also be trained with both heads together. The head of the CTC model 540 is trained with a CTC loss function, and the head of the attention decoder 550 is trained with a cross entropy loss function. The two loss functions are connected with a linear difference weight, i.e., the two loss functions each have a corresponding weight. Online computing workload of this model is almost the same as that of one model, but this model can provide both CTC and attention information, thereby enabling large-scale industrial deployment.

Therefore, some embodiments of the present disclosure additionally provide the CTC output 560 (i.e., the decoded acoustic information of the CTC model) in the SMLTA model 500, realize outputting two kinds of decoded acoustic information of two different types of acoustic models without increasing additional computing workload or increasing only a very small amount of computing workload, and expands the decoding space, thereby improving the accuracy rate of voice identification of the SMLTA model.

FIG. 6 shows a schematic diagram of a process 600 of adjustment and optimization by double decoding of SMLTA and CTC fusing multiple features according to an embodiment of the present disclosure. As shown in FIG. 6, for an inputted voice signal 610, at block 611, a SMLTA acoustic model 612 scoring a unified SMLTA acoustic part, to obtain, e.g., a CTC output (CTC peak Information at a location(A) in FIG. 6) and a SMLTA output (SMLTA distribution information at a location(B) in FIG. 6) from FIG. 5. Then, a SMLTA decoder (e.g., a decoding thread) and a CTC decoder (e.g., a decoding thread) are used respectively to perform audio decoding using their respective information in their respective space, output their respective N candidate decoding results, then sort comprehensive decisions of the multiple features of these candidate results, and output a best identification result.

In the process 600 of adjustment and optimization by double decoding of SMLTA and CTC fusing multiple features in FIG. 6, four parts are mainly involved: a CTC and attention double-headed acoustic scoring module inside the SMLTA model 612, a SMLTA decoder and a corresponding language model 632 thereof, a CTC decoder and a corresponding language model 622 thereof, and a multi-feature decision model 640.

As mentioned above, the CTC and attention integrated attention model structure within the SMLTA model 612 can output the CTC peak information and the SMLTA distribution information simultaneously. The online computing workload of this model is almost the same as that of one model, thus greatly avoiding the problem of double computing costs caused by double decoding.

At block 631, the SMLTA decoder generates N candidate identification results 633 by decoding based on the SMLTA output and the corresponding language model 632. The SMLTA decoder realizes decoding the obtained SMLTA acoustic result on its independent language model. Due to joint modeling of acoustic and language information, the defect of the conventional CTC model that can only perform modeling of acoustic models is overcome, and the model identification rate is improved. However, joint modeling increases constraints. After decoding and clipping, the abundance of the acoustic path in the identification result will be much lower than that of the CTC model. Therefore, some embodiments of the present disclosure use the CTC acoustic output to make up for the lack of diversity of the SMLTA acoustic output.

At block 621, the CTC decoder generates N candidate identification results 623 by decoding based on the CTC output and the corresponding language model 622. The CTC decoder acquires the CTC peak information for decoding on the independent language model. The accuracy of 1 best identification result provided by the CTC decoder may be lower than that of 1 identification result of the SMLTA decoder, but the abundance of its N best identification results makes its extreme performance tend to be higher than that of N best identification results of the SMLTA decoder.

The multi-feature decision model 640 extracts multiple features of each candidate identification result based on the candidate identification result 633 of the SMLTA decoder and the candidate identification result 623 of the CTC decoder, and determines the final voice identification result 650 by multi-feature fusion. This complementarity of the SMLTA and the CTC makes it possible to obtain benefits using the decision model. In some embodiments, a bidirectional LSTM model may be used to fuse multiple features of the candidate identification results obtained by the two decoders, and make a decision to give a best identification result. This solution not only maintains the high-precision characteristics of the SMLTA model, but also supplements the problem of identification error of a single SMLTA decoder in some example cases using the diversity of the CTC model results. The decision model recombines the features from a multi-feature level, fuses the strengths of the two models, and further improves the identification rate.

In some embodiments, the extracted multi-features not only include acoustic model features and language model features, but also may include confidence degree features, domain information features, semantic features, language features, sentence similarity features, user features, and the like. In addition, new features may also be added for expansion, to further improve the robustness and accuracy of the identification system. In this way, by multi-feature fusion, SMLTA decoded and CTC decoded candidate identification results are comprehensively sorted, and a better voice identification result can be obtained.

In some embodiments, the multi-feature decision model 640 may be implemented using a dual LSTM model, and the multi-feature decision model 640 may be trained based on pre-annotated training data. In some embodiments, real error examples in the voice identification system can be analyzed, and relevant features of an erroneous part can be extracted and added to the multi-feature decision model 640, thereby strengthening the feature training of a part with a high error rate, and further improving the accuracy rate of voice identification.

In some embodiments, the SMLTA decoder and the CTC decoder can use different language models respectively. For example, the SMLTA decoder can use a language model of a special purpose scenario, and the CTC decoder can use a language model of a general purpose scenario, thus facilitating decoding under different prior constraints. Through special design, the accuracy of domain identification and the generalization of general identification can be balanced very well to expand the decoding space.

Figure 7:
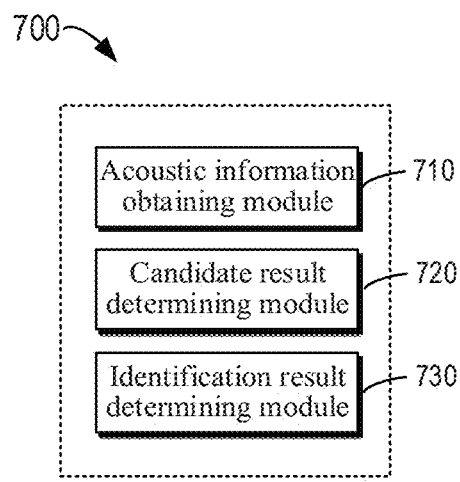
FIG. 7 shows a block diagram of an apparatus for voice identification according to an embodiment of the present disclosure.

FIG. 7 shows a block diagram of an apparatus 700 for voice identification according to an embodiment of the present disclosure. As shown in FIG. 7, the apparatus 700 includes an acoustic information obtaining module 710, a candidate result determining module 720, and an identification result determining module 730. The acoustic information obtaining module 710 is configured to obtain, for an inputted voice signal, a first piece of decoded acoustic information and a second piece of decoded acoustic information respectively by a first acoustic model and a second acoustic model, the first acoustic model being generated by acoustic modeling and the second acoustic model being generated by joint modeling of acoustic model and language model. The candidate result determining module 720 is configured to determine a first group of candidate identification results and a second group of candidate identification results respectively based on the first piece of decoded acoustic information and the second piece of decoded acoustic information. The identification result determining module 730 is configured to determine an identification result for the voice signal based on the first group of candidate identification results and the second group of candidate identification results.

In some embodiments, the first acoustic model is a connected temporal classification (CTC) model, the second acoustic model is a connectionist temporal classification (CTC) model, the second acoustic model is a streaming multi-layer truncated attention (SMLTA) model, and the acoustic information obtaining module 710 includes: a first acoustic information obtaining module configured to obtain the first piece of decoded acoustic information by the CTC model based on the voice signal, the first piece of decoded acoustic information including peak information related to the voice signal; and a second acoustic information obtaining module configured to obtain the second piece of decoded acoustic information by an attention decoder in the SMLTA model based on the voice signal and the peak information.

In some embodiments, the candidate result determining module 720 includes: a first candidate result determining module configured to determine the first group of candidate identification results by a CTC decoder based on the first piece of decoded acoustic information; and a second candidate result determining module configured to determine the second group of candidate identification results by the SMLTA decoder based on the second piece of decoded acoustic information.

In some embodiments, the first candidate result determining module includes: a third candidate result determining module configured to determine the first group of candidate identification results based on a first language model and the first piece of decoded acoustic information, and the second candidate result determining module includes: a fourth candidate result determining module configured to determine the second group of candidate identification results based on a second language model and the second piece of decoded acoustic information, where the first language model is different from the second language model.

In some embodiments, the identification result determining module 730 includes: a combining module configured to obtain a third group of candidate identification results based on a combination of the first group of candidate identification results and the second group of candidate identification results; an extracting module configured to extract multiple features of each candidate identification result in the third group of candidate identification results; and a determining module configured to determine the identification result for the voice signal based on the multiple features of each candidate identification result.

In some embodiments, the extracting module includes: a feature obtaining module configured to obtain an acoustic feature and a language feature of each candidate identification result; and a feature determining module configured to determine a domain feature of each candidate identification result.

In some embodiments, the extracting module further includes: a second feature extracting module configured to extract at least one of the following features of each candidate identification result: a confidence degree feature, a semantic feature, a similarity feature, or a user feature.

In some embodiments, the first group of candidate identification results includes the determined identification result and the second group of candidate identification results excludes the determined identification result.

It should be understood that the acoustic information obtaining module 710, the candidate result determining module 720, and the identification result determining module 730 shown in FIG. 7 may be included in one or more electronic devices. In addition, it should be understood that the modules shown in FIG. 7 may execute the steps or actions in the method or process with reference to each embodiment of the present disclosure.

Therefore, according to some embodiments of the present disclosure, a solution of voice identification adjusted and optimized by double decoding of SMLTA and CTC fusing multiple features is presented. Whilst implementing SMLTA decoding, CTC decoding is performed using information of the inside CTC model, and the acoustic diversity of the CTC decoding result is used to make up for the defects of a few acoustic paths of SMLTA. In addition, a decision may be made to re-sort identification results using multi-level features, thereby further improving the identification accuracy rate of SMLTA.

Figure 8:
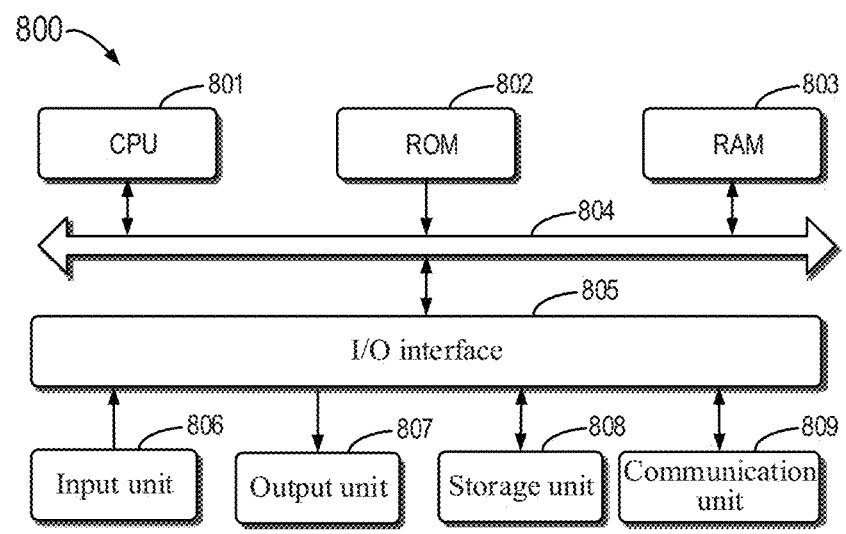
FIG. 8 shows a block diagram of an electronic device capable of implementing a plurality of embodiments of the present disclosure.

FIG. 8 shows a schematic block diagram of an example device 700 capable of implementing various embodiments of the present disclosure. The device 800 may be used to implement the apparatus 700 for voice identification of the present disclosure. As shown in the figure, the device 800 includes a central processing unit (CPU) 801 that may perform various appropriate actions and processing in accordance with computer program instructions stored in a read only memory (ROM) 802 or computer program instructions loaded into a random access memory (RAM) 803 from a storage unit 808. In the RAM 803, various programs and data required for the operation of the device 800 may also be stored. The CPU 801, the ROM 802, and the RAM 803 are connected to each other through a bus 804. An input/output (I/O) interface 805 is also coupled to the bus 804.

A plurality of components in the device 800 are coupled to the I/O interface 805, including: an input unit 806, such as a keyboard or a mouse; an output unit 807, such as various types of displays, or speakers; the storage unit 808, such as a disk or an optical disk; and a communication unit 809 such as a network card, a modem, or a wireless communication transceiver. The communication unit 809 allows the device 800 to exchange information/data with other devices over a computer network such as the Internet and/or various telecommunication networks.

The processing unit 801 performs the various methods and processes described above, such as the method 200. For example, in some embodiments, the method may be implemented as a computer software program that is tangibly embodied in a machine readable medium, such as the storage unit 808. In some embodiments, some or all of the computer programs may be loaded and/or installed onto the device 800 via the ROM 802 and/or the communication unit 809. When a computer program is loaded into the RAM 803 and executed by the CPU 801, one or more of the actions or steps of the method described above may be performed. Alternatively, in other embodiments, the CPU 801 may be configured to perform the method by any other suitable means (e.g., by means of firmware).

The functions described herein above may be performed, at least in part, by one or more hardware logic components. For example, and without limitation, examples of hardware logic components that may be used include: Field Programmable Gate Array (FPGA), Application Specific Integrated Circuit (ASIC), Application Specific Standard Product (ASSP), System on Chip (SOC), Complex Programmable Logic Device (CPLD), and the like.

Program codes for implementing the method of the present disclosure may be written in any combination of one or more programming languages. These program codes may be provided to a processor or controller of a general purpose computer, special purpose computer or other programmable data processing apparatus such that the program codes, when executed by the processor or controller, enables the functions/operations specified in the flowcharts and/or block diagrams being implemented. The program codes may execute entirely on the machine, partly on the machine, as a stand-alone software package partly on the machine and partly on the remote machine, or entirely on the remote machine or server.

In the context of the present disclosure, the machine readable medium may be a tangible medium that may contain or store programs for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, portable computer disk, hard disk, random access memory (RAM), read only memory (ROM), erasable programmable read only memory (EPROM or flash memory), optical fiber, portable compact disk read only memory (CD-ROM), optical storage device, magnetic storage device, or any suitable combination of the foregoing.

In addition, although various actions or steps are described in a specific order, this should not be understood that such actions or steps are required to be performed in the specific order shown or in sequential order, or all illustrated actions or steps should be performed to achieve the desired result. Multitasking and parallel processing may be advantageous in certain circumstances. Likewise, although several specific implementation details are included in the above discussion, these should not be construed as limiting the scope of the present disclosure. Certain features described in the context of separate embodiments may also be implemented in combination in a single implementation. Conversely, various features described in the context of a single implementation may also be implemented in a plurality of implementations, either individually or in any suitable sub-combination.

Although the embodiments of the present disclosure are described in language specific to structural features and/or method logic actions, it should be understood that the subject matter defined in the appended claims is not limited to the specific features or actions described above. Instead, the specific features and actions described above provide examples of implementing the claims.

What is claimed is:

1. A method for voice identification, comprising:
obtaining, for an inputted voice signal, a first piece of decoded acoustic information and a second piece of decoded acoustic information respectively by a first acoustic model and a second acoustic model, the first acoustic model being generated by acoustic modeling and the second acoustic model being generated by joint modeling of acoustic model and language model;
determining a first group of candidate identification results and a second group of candidate identification results respectively based on the first piece of decoded acoustic information and the second piece of decoded acoustic information; and
determining an identification result for the voice signal based on the first group of candidate identification results and the second group of candidate identification results.

2. The method according to claim 1, wherein the first acoustic model is a connectionist temporal classification (CTC) model, the second acoustic model is a streaming multi-layer truncated attention (SMLTA) model, and the obtaining a first piece of decoded acoustic information and a second piece of decoded acoustic information respectively by a first acoustic model and a second acoustic model comprises:
obtaining the first piece of decoded acoustic information by the CTC model based on the voice signal, the first piece of decoded acoustic information including peak information related to the voice signal; and
obtaining the second piece of decoded acoustic information by an attention decoder in the SMLTA model based on the voice signal and the peak information.

3. The method according to claim 2, wherein the determining a first group of candidate identification results and a second group of candidate identification results comprises:
determining the first group of candidate identification results by a CTC decoder based on the first piece of decoded acoustic information; and
determining the second group of candidate identification results by the SMLTA decoder based on the second piece of decoded acoustic information.

4. The method according to claim 3, wherein
the determining the first group of candidate identification results comprises: determining the first group of candidate identification results based on a first language model and the first piece of decoded acoustic information, and
the determining the second group of candidate identification results comprises: determining the second group of candidate identification results based on a second language model and the second piece of decoded acoustic information,
wherein the first language model is different from the second language model.

5. The method according to claim 1, wherein the determining an identification result for the voice signal comprises:
obtaining a third group of candidate identification results based on a combination of the first group of candidate identification results and the second group of candidate identification results;
extracting multiple features of each candidate identification result in the third group of candidate identification results; and
determining the identification result for the voice signal based on the multiple features of each candidate identification result.

6. The method according to claim 5, wherein the extracting multiple features of each candidate identification result in the third group of candidate identification results comprises:
obtaining an acoustic feature and a language feature of each candidate identification result; and
determining a domain feature of each candidate identification result.

7. The method according to claim 6, wherein the extracting multiple features of each candidate identification result in the third group of candidate identification results further comprises:
extracting at least one of following features associated with each candidate identification result: a confidence degree feature, a semantic feature, a similarity feature, or a user feature.

8. The method according to claim 1, wherein the first group of candidate identification results includes the determined identification result and the second group of candidate identification results excludes the determined identification result.

9. A non-transitory computer readable storage medium, storing a computer program thereon, wherein the program, when executed by a processor, causes the processor to execute the method according to claim 1.

10. An apparatus for voice identification, comprising:
at least one processor; and
a memory storing instructions, wherein the instructions when executed by the at least one processor, cause the at least one processor to perform operations, the operations comprising:
obtaining, for an inputted voice signal, a first piece of decoded acoustic information and a second piece of decoded acoustic information respectively by a first acoustic model and a second acoustic model, the first acoustic model being generated by acoustic modeling and the second acoustic model being generated by joint modeling of acoustic model and language model;
determine a first group of candidate identification results and a second group of candidate identification results respectively based on the first piece of decoded acoustic information and the second piece of decoded acoustic information; and
determining an identification result for the voice signal based on the first group of candidate identification results and the second group of candidate identification results.

11. The apparatus according to claim 10, wherein the first acoustic model is a connectionist temporal classification (CTC) model, the second acoustic model is a streaming multi-layer truncated attention (SMLTA) model, and the obtaining a first piece of decoded acoustic information and a second piece of decoded acoustic information respectively by a first acoustic model and a second acoustic model comprises:

obtaining the first piece of decoded acoustic information by the CTC model based on the voice signal, the first piece of decoded acoustic information including peak information related to the voice signal; and obtaining the second piece of decoded acoustic information by an attention decoder in the SMLTA model based on the voice signal and the peak information.

12. The apparatus according to claim 11, wherein the determining a first group of candidate identification results and a second group of candidate identification results comprises:

determining the first group of candidate identification results by a CTC decoder based on the first piece of decoded acoustic information; and determining the second group of candidate identification results by the SMLTA decoder based on the second piece of decoded acoustic information.

13. The apparatus according to claim 12, wherein the determining the first group of candidate identification results comprises: determining the first group of candidate identification results based on a first language model and the first piece of decoded acoustic information, and the determining the second group of candidate identification results comprises: determining the second group of candidate identification results based on a second language model and the second piece of decoded acoustic information, wherein the first language model is different from the second language model.

14. The apparatus according to claim 10, wherein the determining an identification result for the voice signal comprises:

obtaining a third group of candidate identification results based on a combination of the first group of candidate identification results and the second group of candidate identification results;

extracting multiple features of each candidate identification result in the third group of candidate identification results; and determining the identification result for the voice signal based on the multiple features of each candidate identification result.

15. The apparatus according to claim 14, wherein the extracting multiple features of each candidate identification result in the third group of candidate identification results comprises:

obtaining an acoustic feature and a language feature of each candidate identification result; and determining a domain feature of each candidate identification result.

16. The apparatus according to claim 15, wherein the extracting multiple features of each candidate identification result in the third group of candidate identification results further comprises:

extracting at least one of following features associated with each candidate identification result: a confidence degree feature, a semantic feature, a similarity feature, or a user feature.

17. The apparatus according to claim 10, wherein the first group of candidate identification results includes the determined identification result and the second group of candidate identification results excludes the determined identification result.

\* \* \* \* \*